J. Stimpson,

Pitcher,

No. 2,981. Reissued June 9, 1868.

Witnesses:

Alex Mahon

A. M. Smith

Inventor:

Julia M. Colburne
widow
by her attorney
Geo. Harding

N. PETERS, PHOTO-LITHOGRAPHER, WASHINGTON, D. C.

United States Patent Office.

JULIA M. COLBURN, OF BALTIMORE, MARYLAND, ADMINISTRATRIX OF THE ESTATE OF JAMES STIMPSON, DECEASED.

*Letters Patent No.* 11,819, *dated October* 17, 1854; *antedated April* 17, 1854; *extended seven years; reissue No.* 2,981. *dated June* 9, 1868.

IMPROVED VESSEL FOR HOLDING LIQUIDS.

The Schedule referred to in these Letters Patent and making part of the same.

TO ALL WHOM IT MAY CONCERN:

Be it known that JAMES STIMPSON, late of Baltimore, Maryland, did, in his lifetime, invent a new and useful Improvement, to which he gave the name of Ice-Pitchers; and that the following is a full, clear, and exact description of the same, in which—

Figure 1:
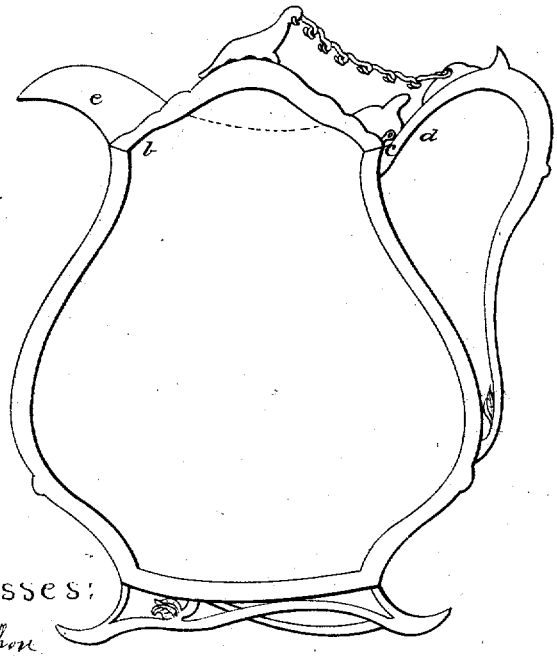

Figure 1 represents a vertical section of the ice-pitcher with the aperture of discharge covered.

Figure 2:
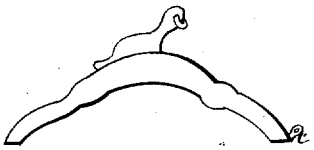

Figure 2, a vertical section of the lid.

Figure 3:
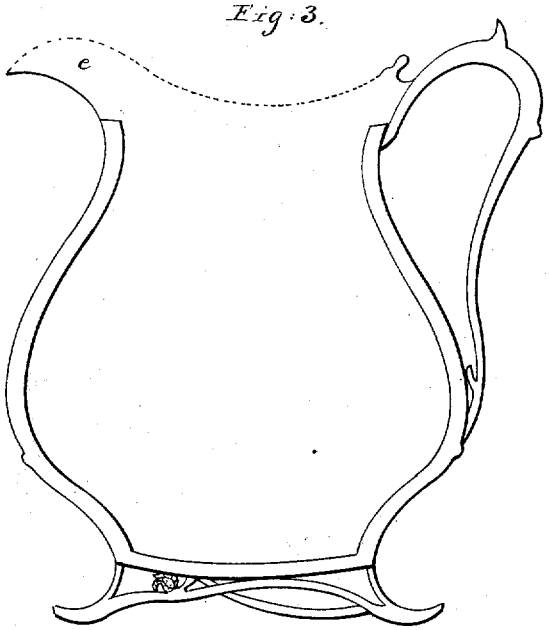

Figure 3, a vertical section of the ice-pitcher with lid off.

Prior to the invention of said JAMES STIMPSON, refrigerating-walls for ice-houses, preservers of ice, meat, and vegetables had been used. Stationary water-coolers, with spigots, had also been used. The most general mode of using ice-water was by placing it in an ordinary open china or stone pitcher with the ice, about the time it was intended to be used. Owing to the fact that metal was a good conductor of heat, it was not well adapted to be used in the manufacture of pitchers to be used for holding ice-water. The ice-houses, ice-chests, water-coolers, were unlike a pitcher, in the respect that they were stationary, and did not require either to be handed about when being used, or to be tilted. Hence any desired amount of non-conducting or refrigerating-space between the double walls by which they were respectively surrounded, could be allowed, and the size and weight of the whole structure, as compared with the internal capacity, were immaterial. On the other hand, it was essential in an ice-pitcher that portability and a convenient capability to tilt should be preserved, and the said JAMES STIMPSON, during his lifetime, discovered that by using double walls of the pitcher, composed of thin sheet metal, and allowing a very small non-conducting or refrigerating-space between the walls, the portability of the pitcher, and its capability to tilt, might be preserved, and that metal might be used in constructing it, and the ice and water could be preserved therein cooler for a far greater length of time than with the stone or china pitchers formerly used; also, the annoyance arising from the exterior deposit of atmospheric moisture would be obviated; at the same time pure water could be poured from the top of the vessel clear of sediment. It was also important, with a pitcher constructed upon this principle, that the top of the pitcher should be covered, and that the access of air to the interior of the pitcher, through the lip or nose-attachment, over or through which the water is poured, should be closed, except at the moment of pouring the water, otherwise a circulation of air would be established at that place which would diminish the practical, economical, or refrigerative value of the pitcher. Accordingly, the said STIMPSON so combined and attached the spout or lip to the pitcher, and a cover or lid thereto, that access of air thereat was cut off at all times, except during the act of pouring.

The internal part, Fig. No. 1 in the accompanying drawings, that holds the water, should have a flange or offset at the top, inclined upwards, of the width of the space that is to be left, say a quarter of an inch, more or less. Between the internal and external part, No. 2 is to be joined, immediately below the upper edge, with as short an offset as possible at *b*. The cover of the pitcher is hinged, and is only to touch and rest upon the upper edge of the spout, so as to open easily in the act of pouring, to permit the water to escape. The cover should be double, having vacant space between the internal and external surfaces, to which external surface the hinge *c* should be attached to connect with the handle *d*, the centre of the hinge being outside of a perpendicular, from the outer surface of the pitcher, so that every part of the cover shall lift from the pitcher without lateral friction or wear. The nose or lip *e* of the pitcher should be attached to the external part, as also the handle.

The following experiments were tried with a double Britannia ice-pitcher and a stone-china pitcher, such as were ordinarily used:

At ten o'clock a. m. the pitchers were placed, about two feet from each other, on a table, in a room, of which the temperature of the atmosphere was 75° Fahrenheit. Three pints of water, of 71° Fahrenheit, and one and one-half pound of ice, were put in each pitcher. They were examined every hour by immersing in them the bulb of a thermometer, and the following table shows the times at which the ice melted in each pitcher, and also the temperature of the water. The ice in the china pitcher was in one large piece, and that in the Britannia pitcher was in several pieces. Ice should be put into the pitchers in as large a piece as possible, as in equal weights a large piece will last longer than a small one. The pitcher should be turned on its side when the ice is being put in, so as not to let it fall heavily against the bottom.

| Time. | Temperature of water in Britannia ice-pitcher. | Temperature of water in stone-china pitcher. | Temperature of water in a pitcher without ice, standing by the side of the other. | Temperature of atmosphere. | No. of hours. |
|---|---|---|---|---|---|
| 10 a. m. | 71° Fahrenheit. | 71° Fahrenheit. | 71° Fahrenheit | 75° Fahrenheit. | 0 |
| 11 a. m. | 42° " | 46° " | 71½° " | 75° " | 1 |
| 12 a. m. | 42° " | 48° " | 71½° " | 75° " | 2 |
| 12 10 min. | .. " | Ice melted. | .. " | .. " | 2 10 min. |
| 1 p. m. | 43° " | 56° Fahrenheit. | 72° " | 75° " | 3 |
| 2 p. m. | 43° " | 60° " | 72° " | 76° " | 4 |
| 3 p. m. | 44° " | 64° " | 72° " | 77° " | 5 |
| 4 p. m. | 45° " | 67° " | 72° " | 77° " | 6 |
| 4 50 min. | Ice melted. | .. " | .. " | .. " | 6 50 min. |
| 5 p. m. | 46° Fahrenheit. | 68° " | 72° " | 77° " | 7 |
| 6 p. m. | Not examined. | .. " | .. " | .. " | 8 |
| 7 p. m. | 54° Fahrenheit. | 71° " | 72° " | 78° " | 9 |
| 8 p. m. | Not examined. | .. " | .. " | .. " | 10 |
| 9 p. m. | 57° Fahrenheit. | 72° " | 72° " | 76° " | 11 |
| 10 p. m. | Not examined. | .. " | .. " | .. " | 12 |
| 11 p. m. | 59° Fahrenheit. | 72° " | 72° " | 76° " | 13 |
| 12 p. m. | 60° " | 72° " | 72° " | 76° " | 14 |
| 8 a. m. | 66° " | 70° " | 68° " | 73° " | 22 |

In order to assist in the opening of the cover at the spout or lip in the act of pouring, so as to permit the water to flow, a chain is attached from the top of the lid to the handle. A treble wall would of course answer as well as a double wall, being the equivalent therefor.

Having thus described the said improvement, what is claimed as the invention of said JAMES STIMPSON, is—

1. A pitcher for preserving ice-water cool, combined with double walls, enclosing between them air or equivalent non-conducting material, so arranged as not to impair the portability of the pitcher, and its capability of discharging its contents by pouring nor its capacity for holding water.

2. In combination with a double-wall ice-pitcher, a nose, lip, or spout, through which the water is discharged, and a movable cover across the discharge-way, which prevents access of air into the pitcher thereat, except during the act of pouring.

JULIA M. COLBURN,
*Administratrix.*

Witnesses:
GEO. C. BENNIMAN,
SARAH J. STIMPSON.